Patented May 3, 1932

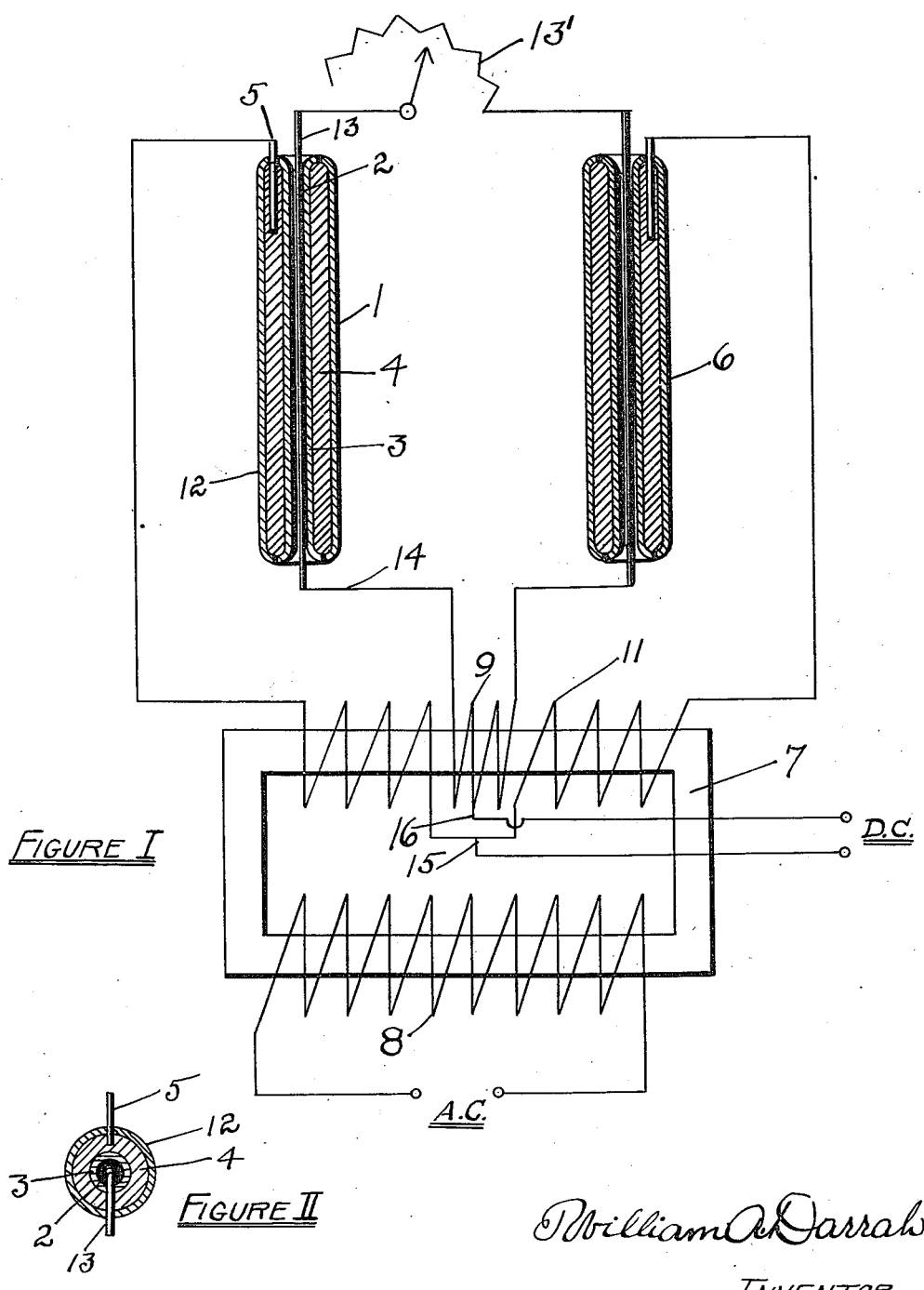

1,856,865

UNITED STATES PATENT OFFICE

WILLIAM A. DARRAH, OF CHICAGO, ILLINOIS

RECTIFIER

Application filed July 23, 1926. Serial No. 124,416.

This invention relates to devices for rectifying alternating electric current and may be used either as a so-called valve to permit the flow of current in one direction only or as a rectifier to direct both waves of an alternating current in one direction.

This device may be used, by making proper modifications in design and operating characteristics on circuits of practically any desired voltage or current as will be set forth later in this specification.

Some of the objects of this invention are to provide simple, effective, economical means for producing uni-directional current from an alternating current. Other objects of this device are to provide a mechanism for handling practically any desired size of current or any desired voltage.

Another object of this device is to provide rectifying means which will be entirely controllable either manually or automatically.

Other objects are to provide equipment which will be durable, simple, efficient and involve a minimum maintenance charge.

Other objects will be apparent from the drawings, description and claims.

Referring to the drawings, Figure I shows diagrammatically one form of the essential features of my invention, while Figure II shows a cross section of one of the valve units.

Referring to the drawings, (1) indicates a valve unit which consists of a central conductor (2) preferably of nichrome or other material which will stand a fairly elevated temperature without deterioration. Conductor (2) is surrounded by a shell (3) which may be made of glass, enamel or other materials as will be later described in detail in this specification.

Thermo-electric material (4) is in contact with tube or shell (3) and also in electrical contact with lead (5).

(6) represents another valve unit which may be similar in construction to unit (1) and will, therefore, not be described in detail. If it is desired to use merely a single valve and produce a uni-directional pulsating current from an alternating current, one valve unit only is required and this may be interposed directly in series with the alternating current. If it is desired to rectify both portions of the alternating current wave a construction similar to the circuit shown in Figure I should be used or any of the well-known expedients in the way of rectifier circuits.

(7) indicates a transformer which may be of any conventional type. (8) represents the primary winding of the transformer to which the alternating current is supplied. The letters A and C indicate the alternating current terminals of this winding.

(9) represents the exciter winding which is connected in series with conductor (2) of the valve element and also with a variable resistance (10) which serves to control the amount of current flowing through conductor (2) and, therefore, the temperature of conductor (2) and the surrounding shell (3).

(11) represents the winding of the transformer which supplies current for the circuit to be rectified. Obviously the entire transformer (7) may be constructed as an auto-transformer or any of the other well-known arrangements common in rectifier circuits.

The terminals of coil (11) are connected to the lead (5) which make electrical contact with the thermo-electric material (4). The entire valve unit may be surrounded with a shell (12) for protection. (13) designates one terminal of conducting member (2) while (14) represents the other terminal of conducting member (2). (15) represents the central point of coil (11) and (16) represents the central point of coil (9) both points should be taken as the approximate electrical centers. Leads from (5) and (6) represent the terminals or connections to the direct current load. The letters "D C" indicate the terminals from which direct current will be obtained when alternating current is applied to terminals marked "A C" and the balance of the equipment is properly adjusted.

The principles of operation of this equipment may be understood when it is stated that a current passing through a circuit of two thermo-electric metals will absorb heat when the current passes in one direction and liberate heat when the current passes in the opposite direction. The absorption and liberation of heat is due to the so-called "Thompson effect" and/or the so-called "Peltier effect". The absorption brought about by the "Thompson effect" differs with different couples, but always occurs during current flow through the couple in a direction opposite to the direction of current flow which results when the couple is heated. As for example, in the case of bismuth-antimony couple, heat will be produced where the current passes from the antimony to the bismuth and heat will be absorbed at the point where current flows from the bismuth to antimony. It should be noted that when dealing with high temperature differences between the elements of the couple the "Thompson effect" will predominate and when dealing with low temperature differences between the couple elements the "Peltier effect" will predominate. The "Peltier effect" is the phenomena shown when current passes from a cold wire to a hot wire. For example, in the case of copper terminals, heat is absorbed when current passes from a cold terminal to a hot terminal and heat is liberated when current passes from a hot terminal to a cold terminal. In the apparatus heretofore described, conductor (2) is in contact with the material (3) similar to glass, aluminum oxide, quartz, carborundum and a great many other materials, including enamels, all of which show an increase in conductivity with increasing temperatures, at least, up to a certain point, and a decrease in conductivity with lower operating temperatures.

Conductor (2) is maintained at such a temperature by means of the current flowing from coil (9) through rheostat (10) that the material in surface (3) has the desired conductivity. Under these conditions it will be apparent that when a difference of potential is applied between lead (5) which connects with thermo-electric element (4) and lead (2), a current will flow, and the amount of current will depend, of course, upon the voltage applied between these points and the resistance to the current which will largely reside in material (3). If the current applied between terminal (5) and terminal (2) is in such a direction as to increase the temperature of the system by reason of the thermo-electric effect the current will become still higher. On the other hand, if the direction of the flow of current between terminal (5) and terminal (2) is such as to cause an absorption of heat by reason of the thermo-electric action then the temperature of material (3) will be lowered, by the absorption of heat, and the resistance will increase so that substantially no current will flow.

It will, therefore, be obvious that the arrangement described has the properties of an electric valve in allowing the current to flow in one direction, but not in the reverse direction. The valve may be applied in any circuit in the similar way that well known types of electric valves are used.

I have found it sometimes advisable to employ automatic means for regulating the heating current passing through conductor (2) so that the amount of heating current will be reduced when the amount of rectified current is greatest. This is particularly desirable when dealing with large currents. When dealing with very small currents this precaution is of secondary importance. By placing the coil (9) which supplies the exciting or heating current to conductor (2), in a magnetic circuit which becomes substantially saturated or over saturated as the rectified current increases, this effect is obtained. Other obvious and well known voltage regulating means may be substituted for rheostat (10) and adjusted to cause the current in conductor (2) to vary approximately inversely as the rectified current.

The temperature which it is necessary to maintain in conductor (2) depends, of course, upon the nature of the material (3). If glass or the like is used as the material to form conductor (3) it is advisable to maintain the temperature thereof at such a degree that the material will be at approximately the critical point regarding its electrical conductivity. With some insulation this point is near the softening temperature, while in others it may be considerably removed. It is desirable to make (3) of low melting composition such as borax, enamels or a mixture of borax and certain oxides or borax and carbon. Boron oxides mixed with other oxides may be, of course, employed equally well.

It is usually desirable to keep material (3) in a thin layer, the thinner the layer the better as in this way the resistance of layer (3) will be maintained a minimum. It is obviously desirable to hold the resistance of layer (3) as low as possible at all times when current is flowing. It will, therefore, be evident that material (3) should be a substance which has a rapid change from high resistance to low resistance by a small change in temperature. Material (3) should be permanent not subject to destruction, deterioration with heat or electrically and should not evaporate or flow at the operating temperature range. I have found a thin layer of selenium may be used as the material in layer (3).

Certain of the metal oxides may also be used as this material and I have found it feasible to take a rod of metal and form a layer of oxides on it, using this metal for both the conductor (2) and the oxides for material (3). Chromium alloys or even chromium itself may be used in this way providing the surface is formed with a layer of oxide. Other obvious metals or oxides will be apparent from the description which is here given.

The thermo-electric material (4) may be any substance which has sufficient power to absorb heat when the flow of current is in the proper direction.

I have used alloys of antimony and cadmium for this purpose also tellurium, mixture of tellurium and selenium, and a great many other materials including silicon. It is, of course, desirable to use materials which will cause the maximum absorption of heat with the minimum current flow as otherwise sufficient cooling will not be obtained to accomplish the desired results.

Thermo-electric material (4) may, if desired, be retained in a shell or tube (1) for purposes of protecting it from mechanical abrasion or deterioration or softening from heat. The drawings show a tube (12) as for example of glass surrounding material (4).

It will be apparent that the electrical conductivity of material (4) should be as high as possible and the thermal conductivity as good as possible.

It will be apparent that the mass or weight of all materials should be a minimum in order to provide a minimum storage of heat in the valve unit. Obviously if too much heat is stored in the valve unit the cooling effect of the thermo-electric unit will not be sufficient to secure the desired temperature drop to change material (3) from a conductor to an insulator. This is one of the reasons why material (3) should be as thin as possible.

Obviously the total resistance of the circuit to the flow of current should be a minimum in one direction in order to reduce the heating effect to a minimum, and should be a maximum in the other direction in order to reduce the heating effect due to the leakage of current through the closed valve. In other words, the greatest possible change of conductivity in element (3) is desirable.

It will be apparent that the amount of current required to heat conductor (2) and therefore layer (3) will vary with the voltage applied between terminal (5) and terminal (2). Where it is necessary to operate with higher voltages than one film (3) will permit, it is of course feasible to apply several of these units in series. As a rule, however, this equipment when properly designed will work very satisfactorily with high voltages and small currents.

While I have shown the valve element (1) as elongated members in which the material (3) entirely surrounds conductor (2), it will be apparent that such surrounding is not essential as a single contact would accomplish similar results but will not, of course, provide as much current carrying capacity.

Many other obvious arrangements of form and shape will be apparent to those skilled to the art, as for example, a series of flat plates will accomplish similar results to the structure which I have shown.

It will be apparent that the heat required to maintain the insulating layer at the proper temperature may be produced either by the resistance of a heating current flowing through one of the elements of the thermo-couple, or by a separate heating unit of any desired type. Many expedients for heating the insulating layer or the joint between the thermo-electric couple and the layer will be apparent. It will also be obvious that the source of heating current does not necessarily come from the same supply circuit as the one which supplies the current for rectification. It will also be apparent that heating may be accomplished by burning fuel or any other desired means although I have found the electrical means simple, controllable and very satisfactory. The amount of heat required is obviously small.

The description which has been given of the insulating layer or film will make it apparent that many different types of film may be employed depending on operating requirements. It is frequently desirable to employ films which may be called high resistant conductors of the "second class" such conductors are formed from a mixture of silicates with certain conducting oxides. Carborundum in itself has some of the desirable characteristics. The current density through the insulating layer is a matter of importance. Obviously the heat produced by the passage of the current through the resistance of the layer and couple must not be so great that the Thompson effect of the thermo-electric couple cannot absorb it. With this principle in mind those skilled in the art can readily design a valve of the type covered by my invention. It is, of course, possible to cause the insulating layer itself to serve as one element of the thermo-couple. For example compounds of silicon may serve both as the material of the insulating layer, or one of the materials in the insulating layer, and at the same time one of the elements of the couple.

The greater the voltage of the rectified current the thicker may be the insulating layer. The larger the current to be rectified the thinner should be the insulating layer. For many obvious reasons those insulators which become conductors at low temperatures are preferable in many cases to insulators which require a high temperature to pass into the conducting condition.

The insulating layer should have sufficient mechanical strength to retain its position at any working temperature. It is also desirable that the insulator should not be brittle or readily damaged from mechanical strains such as those due to mechanical contraction with change in temperature.

Where I have used the term "thermo-electric couple" in the claims I refer to a type of materials which are conductors at the operating temperatures and at such temperatures that they are conducting show a difference of potential when connected together and subjected to the proper difference of temperature between their two ends.

It will be noted that the heat supplied to the valve or couple need not be strictly uniform in quantity. Also it will be understood that the recitation "continuously supplying heat" employed in the claims is intended to indicate the integrated values over a period of time instead of instantaneous values.

Having now fully described my invention, what I claim as new and wish to secure by Letters Patent in the United States, is as follows:

1. In a thermo-electric valve, a conductor, an insulating layer adjacent to said conductor, means for controllably heating said layer and a second conductor also adjacent said layer, said conductor being made of material to form a thermo-electric couple with said first conductor.

2. An electric valve, consisting of a thermo-electric couple separated by an insulating layer, and provided with means for controllably maintaining said layer at the desired operating temperature.

3. An electric valve consisting of a thermo-electric couple, an insulating layer between the elements of said couple, and means for controllably heating one element of said couple.

4. An electric valve consisting of a thermo-electric couple separated by an insulating layer and electrical heating means for controllably heating said layer and maintaining it at the desired operating temperature.

5. An electric valve consisting of a thermo-electric couple, separated by an insulating layer, and an electric circuit including current varying means for heating an element of said couple.

6. An electric valve adapted to control the flow of current, consisting of a thermo-electric couple separated by an insulating layer and means for controlling the temperature of said insulating layer.

7. An electric valve consisting of a thermo-electric couple separated by an insulating layer, and provided with temperature controlling means, one of the elements of said couple being tellurium.

8. An electric valve consisting of a thermo-electric couple separated by an insulating layer, having a rapid decrease in resistance with increase in operating temperature, and means for regulating the temperature of said layer.

9. A thermo-electric couple separated by an insulating layer, and means for controlling the temperature of said layer.

10. In an electric circuit, a thermocouple separated by an insulating layer, and heating means for automatically maintaining said layer at the operating temperature.

11. A method for rectifying alternating current which comprises interposing in an alternating current circuit a large contact area thermo-responsive element normally an insulator to the flow of current, regulating the temperature of the element so that it becomes a conductor, and then subjecting said element to the Thompson effect and/or Peltier effect.

12. A method for rectifying alternating current which comprises interposing in an alternating current circuit a thermo-responsive element, normally an insulator to current flow in at least one direction, regulating the temperature of the element to obtain its desired conductivity, and simultaneously subjecting said element to the Thompson effect and/or the Peltier effect.

13. In an alternating current circuit, a rectifier, comprising in combination, a thermo-responsive element normally an insulator to current flow in at least one direction, adjustable means for continuously supplying heat to said element, and means for intermittently cooling said element by absorption.

14. In an alternating current circuit, a rectifier, comprising in combination, a thermo-responsive element normally an insulator to current flow in at least one direction, means for continuously heating said element, and means for alternately supplying additional heat to and abstracting heat from said element.

15. A method for rectifying alternating current, which comprises interposing in an alternating current circuit a thermo-responsive element, continuously heating said element for obtaining its desired conductivity, and at the same time alternately abstracting heat from and adding heat to said element.

16. An electric valve comprising a thermo-electric couple, having a layer of oxide separating the couple elements thereof, and means for controllably heating said layer of oxide.

17. An electric valve comprising a thermo-electric couple having one element formed with a layer of its oxide, and disposed between said elements, and means for controllably heating said layer of oxide.

18. A method for rectifying alternating current which comprises interposing in an alternating current circuit a thermo-responsive element, continuously supplying heat to said element for obtaining its desired conductivity and at the same time intermittently cooling the element.

19. An alternating current rectifier comprising a thermo-responsive element, means for interposing said element in an alternating current circuit, means for continuously heating said element and means for subjecting said element to the Thompson effect and/or the Peltier effect.

20. An alternating current rectifier comprising a thermo-responsive element, means for interposing said element in an alternating current circuit, means for heating said element, and separate means for subjecting said element to the Thompson effect and/or the Peltier effect.

21. An alternating current rectifier comprising a thermo-responsive element of large contact area, variable means for heating said element, and separate means for continuously subjecting said element to the Thompson effect and/or the Peltier effect.

22. An alternating current rectifier, comprising a thermo-electric couple, means for interposing said couple in an alternating current circuit, and means for controlling the temperature of said couple.

23. An alternating current rectifier, comprising a thermo-electric couple, means for interposing said couple in an alternating current circuit, and means for controllably varying the temperature of said couple.

24. An alternating current rectifier, comprising a thermo-electric couple, means for interposing said couple in an alternating current circuit, and means for controllably varying the temperature of said couple through a predetermined range.

25. An electric valve, comprising a thermo-electric couple having a layer of oxide separating the couple elements thereof, and means for controlling the temperature of said layer of oxide.

26. An electric valve, comprising a thermo-electric couple having one element formed with a layer of its oxide and disposed between the elements of said couple, and means for controlling the temperature of said layer of oxide.

27. An alternating current rectifier, comprising a thermo-electric couple, means for interposing said couple in an alternating current circuit, and means for variably heating said couple.

28. An alternating current rectifier, comprising a thermo-electric couple, means for interposing said couple in an alternating current circuit, and means for continuously and variably heating said couple.

29. An alternating current rectifier, comprising a thermo-electric couple, means for interposing said couple in an alternating current circuit, means for heating the couple, and means for variably cooling said couple.

30. An alternating current rectifier comprising a film, means for controllably heating said film and means for interposing said film in an alternating current circuit in such a manner that the film will be subjected to thermal changes of the so-called Thompson effect and/or the Peltier effect for varying the temperature thereof.

31. An alternating current rectifier comprising a film, means for continuously heating said film and maintaining the same at the desired operating temperature and means for interposing said film in an alternating current circuit in such a manner that the film will be subjected to thermal changes of the so-called Thompson effect and/or the Peltier effect for varying the temperature thereof.

32. An alternating current rectifier comprising a film normally an insulator to current flow, means for controllably heating said film and means for interposing said film in an alternating current circuit in such a manner that the film will be subjected to thermal changes of the so-called Thompson effect and/or the Peltier effect for varying the temperature thereof.

33. In a film current rectifier, means for varying the temperature of the film in accordance with the frequency of the current being rectified.

34. In a film current rectifier of the character described, means for varying the temperature of the film with each change in direction of flow of the current being rectified.

WILLIAM A. DARRAH.